US005430798A

United States Patent [19]

Gysel

[11] Patent Number: 5,430,798

[45] Date of Patent: Jul. 4, 1995

[54] SCRAMBLED TV-IF SIGNAL TRANSMISSION SYSTEM

[75] Inventor: Hermann Gysel, San Jose, Calif.

[73] Assignee: Synchronous Communications, Inc., San Jose, Calif.

[21] Appl. No.: 259,469

[22] Filed: Jun. 14, 1994

[51] Int. Cl.[6] ........ H04N 7/16

[52] U.S. Cl. ........ 380/10; 380/19

[58] Field of Search ........ 380/10, 19; 348/8

[56] References Cited

U.S. PATENT DOCUMENTS

| | | | |
|---|---|---|---|
| 4,034,402 | 6/1977 | Brian | 380/10 |
| 4,581,765 | 4/1986 | Stec | 455/29 |
| 4,951,313 | 8/1990 | Gysel | 380/10 |
| 4,956,862 | 9/1990 | Robbins et al. | 380/19 |
| 5,136,641 | 8/1992 | Gysel | 380/10 X |
| 5,220,602 | 6/1993 | Robbins et al. | 380/10 X |

*Primary Examiner*—Gilberto Barrón, Jr.
*Attorney, Agent, or Firm*—Fliesler, Dubb, Meyer & Lovejoy

[57] ABSTRACT

A cable TV signal transmission system comprising a Nyquist filter carrier recovery circuit, a mixer, a level shifter and a pre-emphasis circuit for transmitting scrambled TV-IF signals on an FM or digital signal link to a receiver section comprising a de-emphasis circuit, an amplitude modulator circuit and a VSB filter so as to provide to remote TV receivers a scrambled TV-IF signal with correct timing between the video and audio scrambling information.

18 Claims, 4 Drawing Sheets

FIG. 6
FIG. 7
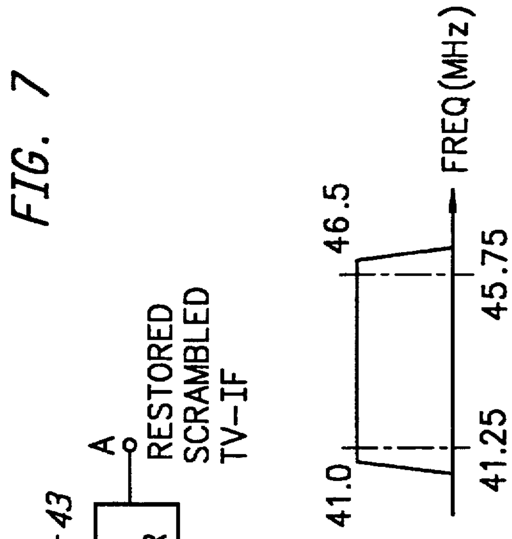
FIG. 10
FIG. 5
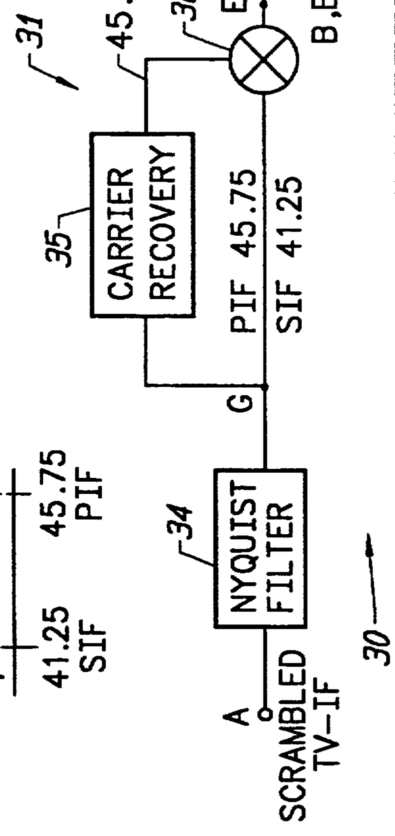
FIG. 4
FIG. 9
FIG. 8

SCRAMBLED TV-IF SIGNAL TRANSMISSION SYSTEM

BACKGROUND OF THE INVENTION

1. Field of the Invention

The present invention relates to cable television systems in general and in particular to a scrambled TV-IF signal transmission system for use in cable television systems.

2. Description of the Related Art

Conventional scrambled cable television signal transmission systems, in addition to other signal generating and transmitting components, typically comprise a TV-IF amplitude modulator circuit, a scrambler circuit, a signal combiner circuit and a VSB filter circuit. The TV-IF amplitude modulator circuit is responsive to baseband video and audio signals for providing picture intermediate frequency (PIF) and sound intermediate frequency (SIF) signals. The scrambler circuit is responsive to the baseband video, the PIF and the SIF signals for providing scrambled PIF and SIF signals. The signal combiner circuit combines the scrambled PIF and SIF signals which are then filtered in the VSB filter to provide a scrambled TV-IF signal, i.e. scrambled combined PIF and SIF signals.

Heretofore, the transmission of scrambled TV-IF signals has been limited to local area television sets, generally by amplitude modulated vestigial sideband (VSB) signal coaxial links, wherein they are descrambled and demodulated for use in the sets. To compensate for disparate video and audio signal delays in the VSB filter circuit and to enable the descrambling circuits coupled to the TV sets to function properly, the timing of the scrambled TV-IF signals is .adjusted in the scrambling circuit.

As cable systems expanded, operators used headend stations to transmit scrambled TV signals to hub stations using FM to service remote television sets. When this was done it was found that linear and non-linear distortions of the scrambled composite TV-IF signal in an FM signal transmission link resulted in unacceptable signal quality. This caused the operators of the cable systems to attempt to use the scrambled, but separate, PIF and SIF signals. However, it was found that the timing adjustments made in the scrambling circuit to adjust for the delays in the scrambled TV-IF signal caused by the VSB filter, as described above, necessarily affected the timing of the scrambled PIF and SIF signals at the input to the VSB, thus requiring the use of a suitable delay adjust interface circuit between the headend and hub stations.

The elimination of the need for the above-described delay adjust interface circuit to transmit scrambled TV-IF to a remote hub station together with the timing constraints associated therewith obviously would be of considerable advantage.

SUMMARY OF THE INVENTION

In view of the foregoing, a principal object of the present invention is a cable TV signal transmission system comprising means for transmitting scrambled TV-IF signals to, and for receiving and processing the same in, local TV sets as well as remote hub stations.

In accordance with the above object there is provided a cable TV signal transmission system comprising a means for generating and transmitting a TV-IF signal, sometimes hereinafter called a transmitter section, and means for receiving and processing the TV-IF signal, sometimes hereinafter called a receiver section, which are interconnected by means of either an FM link or a digital signal transmission link.

In the transmitter section at the input end of the signal transmission link, in addition to all the other circuits (not shown) which are normally found in a headend station, there is provided a Nyquist filter circuit, a carrier recovery circuit, a mixer, a level shifter and a pre-emphasis circuit. The Nyquist filter and carrier recovery circuits are modified versions of similar circuits found in conventional TV receivers. For example, the Nyquist filter circuit comprises a non-sound attenuating filter circuit and the carrier recovery circuit comprises a voltage controlled crystal oscillator (VCXO) circuit which are generally not used in a conventional TV receiver. Moreover, the VCXO is preferably operated at one-third the PIF. Additionally, the mixer comprises a Gilbert cell which is operated at a current of approximately 10 milliamperes (ma) for improved linearity, about ten times greater than that used to operate a Gilbert cell in a conventional TV receiver.

In the receiver section at the output end of the signal transmission link, in addition to all the other circuits (not shown) which are normally found in a hub station, there is provided a de-emphasis circuit, an amplitude modulator (AM modulator) and a VSB filter circuit.

A principal advantage of the above-described system of the present invention is that the TV-IF signals are transmitted to local TV sets as well as over both FM and digital signal links to remote hub stations with no significant delay between the PIF and SIF components thereof. Indeed, the setting of the TV-IF timing in the scrambler in the headend station to obtain proper operation of the local descramblers is all that is required to assure the receipt of appropriately timed combined, scrambled PIF and SIF signals in remote hub stations.

BRIEF DESCRIPTION OF THE DRAWINGS

The above and other objects, features and advantages of the present invention will become apparent from the following detailed description of the accompanying drawings, in which:

FIG. 4 is a block diagram of a transmitter and receiver section interconnected by an FM/digital link according to the present invention;

FIG. 5 is a diagram of the gain (attenuation) v. frequency of the Nyquist filter of FIG. 4;

FIG. 6 is a schematic of the pre-emphasis circuit of FIG. 4;

FIG. 7 is a diagram of the gain (attenuation) as a function of frequency of the pre-emphasis circuit of FIG. 4;

FIG. 8 is a schematic diagram of the de-emphasis circuit of FIG. 4;

FIG. 9 is a diagram of the gain (attenuation) v. frequency of the de-emphasis circuit of FIG. 4;

FIG. 10 is a diagram of the gain (attenuation) v. frequency of the VSB filter circuit of FIG. 4;

DETAILED DESCRIPTION OF THE INVENTION

Figure 1:
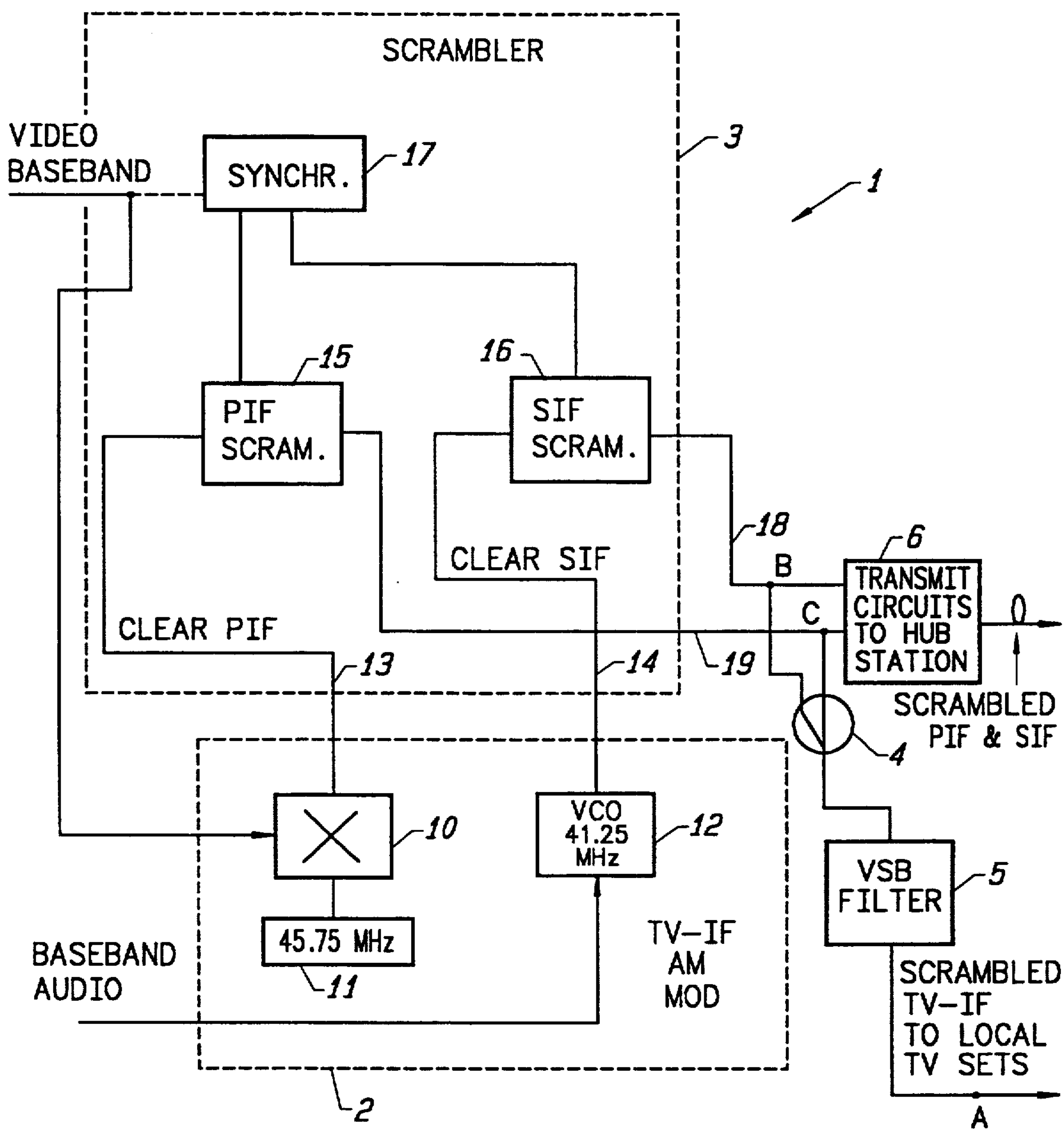
FIG. 1 is a block diagram of a prior known circuit for generating scrambled TV-IF signals and scrambled, but separate, PIF and SIF signals.

Referring to FIG. 1, there is provided a prior known apparatus designated generally as 1 which is responsive to baseband video and audio signals for generating scrambled TV-IF signals and scrambled picture intermediate frequency (PIF) and sound intermediate frequency (SIF) signals for transmission to local as well as remote TV sets, respectively.

In the apparatus 1 there is provided a TV-IF amplitude modulator 2, a scrambler circuit 3, a combiner circuit 4, a VSB filter 5 for transmitting scrambled TV-IF signals to local TV receivers and an interface circuit designated generally as 6 coupled to the scrambler circuit 3 for transmitting PIF and SIF signals to a hub station.

In the AM modulator 2 there is provided a mixer 10 coupled to a local oscillator 11 which provides a carrier frequency of 45.75 MHz and a voltage controlled oscillator (VCO) 12 which operates at a frequency of 41.25 MHz.

In operation, the mixer 10 and the voltage controlled oscillator 12 are responsive to baseband video and baseband audio signals, respectively, for providing PIF and SIF signals on output lines 13 and 14, respectively.

In the scrambler 3 there is provided a PIF scrambler 15, an SIF scrambler 16 and a synchronizing circuit 17.

In operation, the synchronizing circuit 17 is responsive to baseband video signals, the PIF circuit 15 is responsive to the PIF input signal on the signal line 13 and the SIF scrambler circuit 16 is responsive to the SIF signal on the input line 14 to provide at nodes B and C on output lines 18 and 19, respectively, scrambled PIF and SIF signals.

Nodes B and C on output lines 18 and 19 are coupled to first and second inputs of the signal combining circuit 4. The output of the combining circuit 4 provides an input to the VSB filter 5, which provides an output comprising scrambled TV-IF signals.

In practice, the VSB filter 5 causes different timing delays between the scrambled PIF and SIF signals making up the TV-IF combined scrambled PIF and SIF signals. These differential timing delays are eliminated by appropriate adjustments made in the scrambling circuit 3.

In other prior art circuits (not shown) the combining circuit 4 is placed after the VSB filter 5. The PIF is filtered and the SIF bypasses the filter. In these circuits the difference in timing delays between the PIF and SIF signals is significantly greater.

As cable systems expanded and the generation and transmission of scrambled video and audio signals to remote TV sets became necessary, it was found that problems of intermodulation distortion with respect to the transmission of scrambled TV-IF signals occurred on some FM signal links. This caused operators of the affected cable TV systems to use the scrambled PIF and SIF signals appearing on nodes B and C at the output of the scrambler 3. However, because of the adjustment made to the timing of the signals PIF and SIF due to the delays induced therein by the VSB filter 5, the interface circuit 6 was required to allow the transmission of the scrambled PIF and SIF signals to the remote hub stations.

Figures 2, 3:
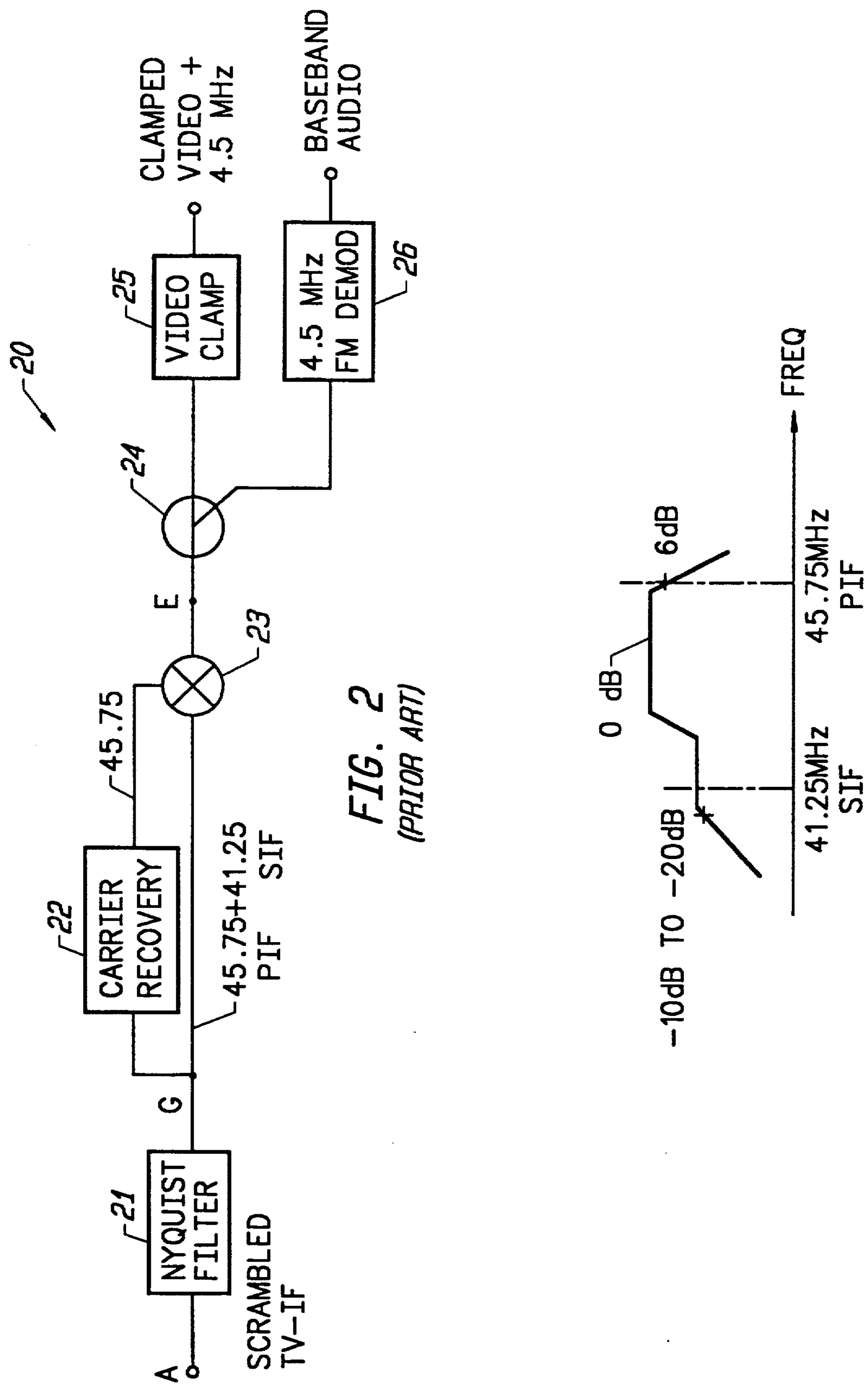
FIG. 2 is a block diagram of a prior known circuit for receiving and processing scrambled TV-IF signals.
FIG. 3 is a drawing of the gain (attenuation) v. frequency of the Nyquist filter of FIG. 2.

Referring to FIG. 2, there is shown a prior known TV receiver circuit designated generally as 20. The receiver 20 is of the type that could be coupled to the output of the VSB filter 5 of FIG. 1 and used locally. In the circuit 20 there is provided a Nyquist filter 21, a carrier recovery circuit 22, a mixer 23, a signal splitter 24, a video clamp 25 and an FM demodulator 26.

Referring to FIG. 3, there is shown a diagram of the gain (attenuation) v. frequency of the Nyquist filter 21 of FIG. 2. As seen in FIG. 3, the Nyquist filter 21 attenuates the SIF signals by approximately 10 dB to 20 dB and the PIF signals by approximately 6 dB.

In operation, scrambled TV-IF signals are applied to node A at the input of the Nyquist filter 21. The Nyquist filter 21 provides an output signal to node G. The signal at node G comprises the PIF having a frequency of 45.75 MHz and the SIF having a frequency of 41.25 MHz. The PIF and SIF signals are applied to the carrier recovery circuit 22 and to the mixer 23 for providing at node E a baseband video signal on which is superimposed a 4.5 MHz audio subcarrier. The signal at node E is then applied to the splitter 24, the outputs of which are coupled to the inputs of video clamp 25 and FM demodulator 26. The video clamp 25 provides a clamped video signal with a 4.5 MHz audio subcarrier superimposed thereon. The FM demodulator 26 demodulates the 4.5 MHz audio subcarrier for providing a baseband audio signal.

In practice, the mixer 23 comprises a Gilbert cell which is typically operated with an input current of less than 1 milliampere (ma).

Referring to FIG. 4, there is provided in accordance with the present invention a cable TV signal transmission system designated generally as 30 for transmitting scrambled TV-IF signals to, and for receiving and processing the signals in local TV sets as well as remote hub stations. In the system 30 there is provided a transmitting section designated generally as 31 and a receiving section designated generally as 32 which are interconnected by means of an FM or digital signal transmission link designated generally as 33.

In the transmitter section 31 at the input end of the signal transmission link 33, in addition to all the other circuits (not shown) which are normally found in a headend stations, there is provided a Nyquist filter circuit 34, a carrier recovery circuit 35, a mixer 36, a level shifter 37 and a pre-emphasis circuit 38. The Nyquist filter circuit 34 and the carrier recovery circuit 35 are modified versions of similar circuits found in conventional TV receivers as shown and described with respect to FIG. 2. For example, the Nyquist filter circuit 34 comprises a non-sound attenuating filter circuit as distinguished from the Nyquist filter 21 as described above with respect to FIG. 3. The carrier recovery circuit 35 comprises a voltage controlled crystal oscillator (VCXO) circuit which is generally not used in a conventional TV receiver. Moreover, the VCXO as used in the present invention is preferably operated at one-third the PIF which is approximately 45.75 MHz.

This significantly improves the dynamic performance of the carrier recovery phase locked loop, i.e. significantly increases the pull-in range, by a factor of 9. Additionally, the mixer 36 comprises a Gilbert cell which is operated at a current of approximately 10 milliamperes (ma), or about ten times greater than that used to operate a Gilbert cell in a conventional TV receiver.

In the receiver section 32 at the output end of the signal transmission link 33, in addition to all the other circuits (not shown) which are normally found in a hub station, there is provided a de-emphasis circuit 40, an amplitude modulator 41 having a local oscillator 42 and a VSB filter circuit 43.

Figure 11:
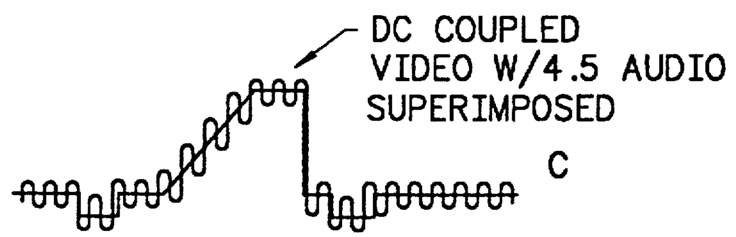
FIG. 11 is a diagram of the signal at node C of the block diagrams of FIGS. 1 and 4.
Figure 12:
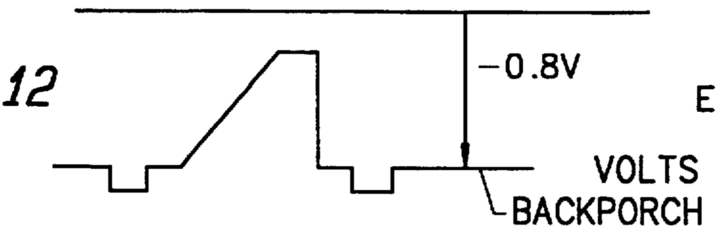
FIG. 12 is a diagram of the signal at node E of the circuits of FIGS. 2 and 4 with the 4.5 MHz superimposed audio carrier omitted for clarity.

In operation, a scrambled TV-IF signal, such as generated at the output of the VSB filter 5 of the apparatus of FIG. 1, is applied to the input of the Nyquist filter 34. The Nyquist filter 34 filters the scrambled TV-IF signal so as to provide at a node G on the output thereof an SIF signal having a frequency of 41.25 MHz and a PIF signal having a frequency of 45.75 MHz. As can be seen in FIG. 5, the SIF signal is substantially non-attenuated and the PIF signal is attenuated by approximately 6 dB. The PIF and SIF signals are applied to the carrier recovery circuit 35. The carrier recovery circuit 35 comprises a voltage controlled crystal oscillator (VCXO) circuit which is preferably operated at one-third the PIF frequency and a frequency tripler for providing on the output thereof a carrier frequency of 45.75 MHz. The carrier frequency and the PIF and SIF signals are applied to the mixer 36 for generating at a node E on the output thereof a baseband video signal on which is superimposed a modulated 4.5 MHz audio subcarrier, the back porch of which is at a negative voltage, e.g. −0.8 volts, as shown in FIG. 12. (The subcarrier is omitted for clarity.) The signal at node E on the output of the mixer 36 is applied to the input of a level shifter 37 wherein the back porch of the baseband video signal is raised to 0.0 volts, as appears at node F shown in FIG. 13. (The subcarrier is omitted for clarity.) The signal at node F is then applied to the pre-emphasis circuit 38, so as to provide at a node C on the output thereof a d-c coupled video with a modulated 4.5 MHz audio subcarrier superimposed thereon, as shown in FIG. 11. The pre-emphasis circuit 38 comprises a resistor R1 coupled in parallel with a capacitor C1 between the nodes F and C and a resistor R2 coupled to ground, as shown in FIG. 6, for providing a 6 dB pre-emphasis of the audio signal at 4.5 MHz, as shown in FIG. 7. The d-c coupled video with the modulated 4.5 MHz audio subcarrier superimposed thereon appearing at node C is applied to the signal transmission link 33 which may be either an FM or a digital signal transmission link.

Figure 15:
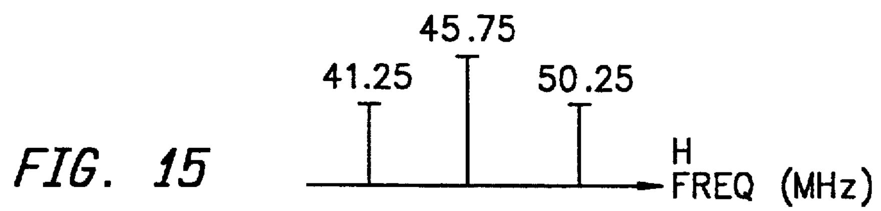
FIG. 15 is a diagram Of the signals at node H of FIG. 4.
Figure 14:
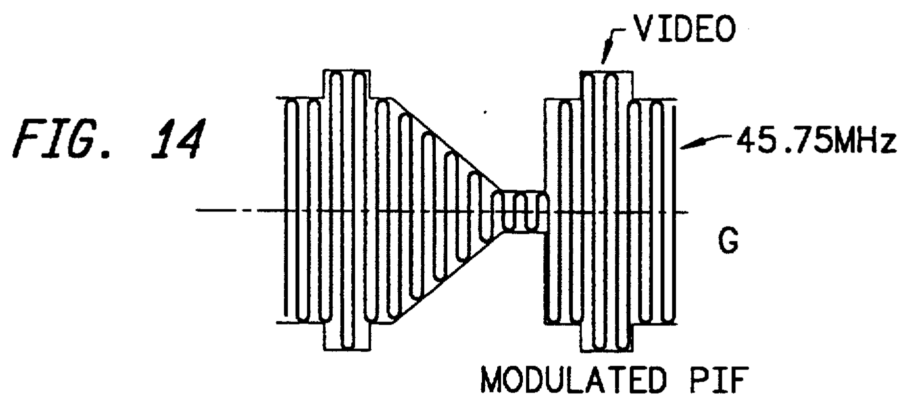
FIG. 14 is a diagram of the signal at node G in the circuits of FIGS. 2 and 4.
Figure 13:
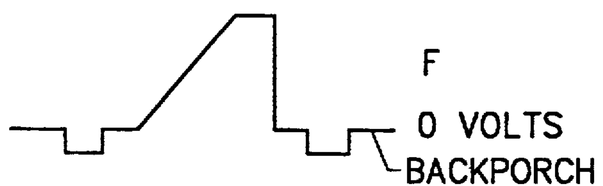
FIG. 13 is a diagram of the signal at node F of FIG. 4 with the 4.5 MHz superimposed audio carrier omitted for clarity.

The output of the signal transmission link 33 is coupled to the de-emphasis circuit 40 which provides at a node F on the output thereof a baseband video signal on which is imposed the modulated 4.5 MHz audio subcarrier as shown in FIG. 13. The de-emphasis circuit 40 comprises a resistor R3 between the nodes C and F and a resistor R4 coupled in series with a capacitor C2 between the node F and ground for providing an attenuation of the audio subcarrier of approximately −6 dB. The signal at the output of the de-emphasis circuit 40 is applied to the AM modulator 41 for providing at a node H on the output thereof a restored scrambled TV-IF signal having a pair of sidebands at 41.25 MHz and 50.25 MHz which are centered at 45.75 MHz, as shown in FIG. 15. The signal at node H is then applied to the input of the VSB filter 43 for providing at a node A on the output thereof a restored scrambled TV-IF signal which is then processed in a conventional manner by conventional TV receivers coupled thereto. The VSB filter 43 provides a substantially flat amplitude and delay frequency response to the restored scrambled TV-IF signal over a frequency range of 41.0 MHz to 46.5 MHz, as shown in FIG. 10.

In referring to the diagrams in FIGS. 11–15 it should be noted that the SIF signals are omitted therefrom for clarity. If the SIF signals were included in the figures, a substantial attenuation of the SIF signals would be noted for the apparatus of FIG. 2 and no attenuation for the apparatus of FIG. 4 at nodes affected thereby.

While a preferred embodiment of the present invention is described above, it is contemplated that modifications may be made thereto for particular applications without departing from the spirit and scope of the present invention. Accordingly, it is intended that the embodiment described be considered only as illustrative of the present invention and that the scope thereof should not be limited thereto but be determined by reference to the claims hereinafter provided.

What is claimed is:

1. A scrambled TV-IF signal transmission system for use in a cable television system having a picture intermediate frequency (PIF) signal and a sound intermediate frequency (SIF) signal comprising:

a Nyquist filter circuit which is responsive to scrambled TV-IF signals and is substantially non-attenuating at said sound intermediate frequency (SIF) for providing a filtered scrambled TV-IF signal;

a carrier recovery circuit coupled to the output of the Nyquist filter circuit for recovering a picture intermediate frequency (PIF) carrier from said filtered scrambled TV-IF signal; and a mixing circuit for mixing the PIF carrier at the output of the carrier recovery circuit and the filtered scrambled TV-IF signals at the output of the Nyquist filter circuit for providing a signal comprising a scrambled baseband video signal on which is superimposed an audio modulated subcarrier.

2. A scrambled TV-IF signal transmission system according to claim 1 wherein said Nyquist filter circuit comprises means for attenuating said PIF signal.

3. A scrambled TV-IF signal transmission system according to claim 1 wherein said Nyquist filter circuit comprises means for attenuating said PIF signal by approximately 6 dB.

4. A scrambled TV-IF signal transmission system according to claim 1 comprising:

means for shifting the level of the output of said mixing circuit.

5. A scrambled TV-IF signal transmission system according to claim 4 wherein said level shifting means comprises means for shifting the level of the back porch of said scrambled baseband video signal on which is superimposed an audio modulated subcarrier to approximately zero (0) volts.

6. A scrambled TV-IF signal transmission system according to claim 1 comprising:

means for shifting the level of the output of said mixing circuit;

means for pre-emphasizing the output of said shifting means; and means for coupling the output of said pre-emphasizing means to the input of a transmission link.

7. A scrambled TV-IF signal transmission system according to claim 6 wherein said level shifting means comprises means for shifting the level of the back porch of said scrambled baseband video signal on which is superimposed an audio modulated subcarrier to approximately zero (0) volts and said pre-emphasizing means comprises means for pre-emphasizing the audio subcarrier component of the output of the level shifting means.

8. A scrambled TV-IF signal transmission system according to claim 7 wherein said pre-emphasizing means comprises means for pre-emphasizing the audio subcarrier component of the output of the level shifting means by approximately 6 dB.

9. A scrambled TV-IF signal transmission system according to claim 1 comprising:

means responsive to a pre-emphasized scrambled baseband video signal on which is superimposed an audio modulated subcarrier for de-emphasizing said scrambled baseband video signal; and means for modulating the amplitude of the output of said de-emphasizing means for providing a restored scrambled TV-IF signal.

10. A scrambled TV-IF signal transmission system according to claim 9 wherein said de-emphasizing means comprises means for de-emphasizing the audio component of said scrambled baseband video signal.

11. A scrambled TV-IF signal transmission system according to claim 10 wherein said de-emphasizing means comprises means for de-emphasizing the audio component of said scrambled baseband video signal by approximately 6 dB.

12. A scrambled TV-IF signal transmission system according to claim 11 comprising:

a filter circuit coupled to the output of said modulating means having a pass band which is substantially non-attenuating to picture and sound intermediate frequency signals.

13. A scrambled TV-IF signal transmission system according to claim 1 wherein said carrier recovery circuit comprises a voltage controlled crystal oscillator (VCXO) circuit for providing a stable phase balance.

14. A scrambled TV-IF signal transmission system according to claim 13 wherein said carrier recovery circuit comprises means for operating said VCXO circuit at a frequency of approximately one-third of the frequency of the PIF signal.

15. A scrambled TV-IF signal transmission system according to claim 14 wherein said carrier recovery circuit comprises means coupled to the output of said for increasing the frequency of the output of said VCXO circuit.

16. A scrambled TV-IF signal transmission system according to claim 15 wherein said frequency increasing means comprises means for tripling the frequency of the output of said VCXO circuit.

17. A scrambled TV-IF signal transmission system according to claim 1 wherein said mixing circuit comprises a Gilbert cell.

18. A scrambled TV-IF signal transmission system according to claim 17 wherein said mixing circuit comprises means for operating said Gilbert cell at a current of approximately 10 milliamperes.

* * * * *